US010690053B2

(12) United States Patent
Geisler (10) Patent No.: US 10,690,053 B2
(45) Date of Patent: Jun. 23, 2020

(54) DEVICE AND METHOD FOR TEMPORARILY STORING GAS AND HEAT

(71) Applicant: APT GMBH—ANGEWANDTE PHYSIK & TECHNOLOGIE, Korbach (DE)

(72) Inventor: Bernd Geisler, Korbach (DE)

(73) Assignee: APT GMBH—ANGEWANDTE PHYSIK & TECHNOLOGIE, Korbach (DE)

( * ) Notice: Subject to any disclaimer, the term of this patent is extended or adjusted under 35 U.S.C. 154(b) by 413 days.

(21) Appl. No.: 15/534,425

(22) PCT Filed: Nov. 2, 2015

(86) PCT No.: PCT/EP2015/075494
§ 371 (c)(1),
(2) Date: Jun. 8, 2017

(87) PCT Pub. No.: WO2016/091475
PCT Pub. Date: Jun. 16, 2016

(65) Prior Publication Data
US 2018/0258849 A1   Sep. 13, 2018

(30) Foreign Application Priority Data
Dec. 11, 2014   (DE) .................. 10 2014 118 466

(51) Int. Cl.
*F02C 6/16*   (2006.01)
*F28D 20/00*   (2006.01)

(52) U.S. Cl.
CPC ............ *F02C 6/16* (2013.01); *F28D 20/0034* (2013.01); *F28D 2020/0004* (2013.01); *Y02E 20/14* (2013.01); *Y02E 60/15* (2013.01)

(58) Field of Classification Search
CPC ... F02C 6/16; Y02E 60/15; F01K 3/12; F28D 2020/0082; F28D 20/0034
See application file for complete search history.

(56) References Cited

U.S. PATENT DOCUMENTS 7,086,231 B2 * 8/2006 Pinkerton ................. F02C 1/05
60/650
9,816,378 B1 * 11/2017 Sneddon ................. F01B 25/00
(Continued)

FOREIGN PATENT DOCUMENTS

CN     102686851 A    9/2012
DE        527794 C    6/1931
(Continued)

*Primary Examiner* — Mark A Laurenzi
*Assistant Examiner* — Xiaoting Hu
(74) *Attorney, Agent, or Firm* — Dinsmore & Shohl LLP (57) ABSTRACT

A device for temporary storage of gas and heat includes a plurality of compressors for compressing a gas, a plurality of compression stages connected in series, each compression stage including one of the plurality of compressors and a gas flow path connected downstream of the one of the plurality of compressors, at least one pressure vessel connected downstream of a last compression stage of the plurality of compression stages in the series for storing the gas compressed by the plurality of compressors, and a heat accumulator arrangement including a plurality of heat accumulators connected in a heat accumulator sequence for storing the heat generated by the compression of the gas, the gas flow path of each compression stage passing through the heat accumulators in succession in the heat accumulator sequence.

15 Claims, 1 Drawing Sheet

(56) References Cited

U.S. PATENT DOCUMENTS

| | | | |
|---|---|---|---|
| 2011/0094229 A1* | 4/2011 | Freund | ...................... F02C 6/14 |
| | | | 60/727 |
| 2011/0094231 A1 | 4/2011 | Freund | |
| 2015/0159960 A1* | 6/2015 | Fujitsuka | ................ F25B 30/02 |
| | | | 165/10 |

FOREIGN PATENT DOCUMENTS

| | | | | |
|---|---|---|---|---|
| DE | 2636417 A1 | 2/1978 | | |
| DE | 2348572 C2 | 8/1985 | | |
| DE | 102008033527 A1 * | 1/2010 | ........... | F28D 20/026 |
| DE | 102008033527 A1 | 1/2010 | | |
| DE | 102010050428 A1 | 5/2012 | | |
| DE | 102011118105 A1 | 5/2013 | | |
| FR | 3014182 A1 | 6/2015 | | |

\* cited by examiner

DEVICE AND METHOD FOR TEMPORARILY STORING GAS AND HEAT

REFERENCE TO RELATED APPLICATIONS

This application is a U.S. National Stage of PCT/EP2015/075494, filed Nov. 2, 2015, which claims priority from German Application No. DE102014118466.1, filed Dec. 11, 2014, the entire content of both of which is incorporated herein by reference.

FIELD OF THE INVENTION

The invention relates to a device for the temporary storage of gas and heat, with at least one pressure vessel, a plurality of compressors by means of which a gas can be compressed, a plurality of compression stages connected in series, each of which includes one of the compressors and a gas flow path connected downstream of the latter, wherein the pressure vessel is connected downstream of a last of the series-connected compression stages, in which the gas compressed by means of the compressor can be stored, and a heat accumulator arrangement comprising a plurality of heat accumulators, by means of which the heat of compression generated by the compression of the gas can be stored. The invention also relates to a method for the temporary storage of gas and heat, wherein a gas is compressed successively in a plurality of compression stages and is then stored in at least one pressure vessel, and wherein heat of compression generated by the compression of the gas is stored after each compression in a plurality of heat accumulators.

BACKGROUND OF THE INVENTION

DE 10 2010 050 428 A1 discloses a compression stage—heat storage power plant for the temporary storage of energy in the form of pressure energy in a compressible medium in a pressure accumulator and in the form of heat energy, with at least one injection pressure stage, which comprises at least one compression device and at least one heat exchange device connected in series, and at least one withdrawal pressure stage, which comprises at least one heat exchange device and at least one expansion device connected in series, wherein the number of injection pressure stages is not equal to the number of withdrawal pressure stages.

In many technical applications process heat is produced, which has to be dissipated. Examples of the utilisation of process heat are cogeneration plants and district heating. Often it would also be energetically advantageous to recover the heat. A direct heat recovery can be achieved for example with heat exchangers in the co-current and counter-current method, which often then enables high energy savings to be made.

With mechanical energy accumulators the heat recovery is an indispensable precondition for acceptable overall efficiencies. A dynamic method such as the co-current or counter-current method is however in this case not necessarily expedient, since the charging and discharging of the energy accumulator should as far as possible be chronologically decoupled from one another. Heat exchangers available on the market are characterised on the other hand by their continuous, simultaneous parallel or anti-parallel flow. The flow of the storage medium requires additional energy expenditure for the circulation, which can be saved.

If energy is stored in the form of compressed air, heat is necessarily produced in the compression (first law of thermodynamics).

It is simplest to calculate the heat for the example of an ideal isothermal compressor. This is theoretically around ⅓ of the expended compression work. In practice the heat is mostly released to the surroundings and the heat losses are in most cases also even considerably higher, for example ⅔ of the expended compression work. The invention is therefore aimed in particular at an adiabatic compressed air energy storage plant, (ACAES plant). In this connection the adjective adiabatic should not be understood here strictly in the thermodynamic sense (no heat exchange at all to the surroundings), but rather should simply mean that the heat generated in the compression should be recovered as far as possible.

Based on the thermal equation of state of ideal gases $pV=nRT$ (the more realistic van-der-Waals equation simply introduces a correction of around 10%) and based on the caloric equation of state for a diatomic gas $U=5/2nRT$ (air is 99% a diatomic gas) it is apparent that for a working gas in a predetermined volume V an increase in the pressure p is produced by raising the temperature T or the amount of substance n or both. In each case this is then equivalent to an increase of the internal energy U or enthalpy $H=U+pV$ of the gas. R denotes the universal gas constant.

For an increase in energy or an increase in enthalpy of the system by supplying heat, it is effectively unimportant whether such a rise in pressure is produced by increasing the number of molecules in the pressure vessel or by raising the temperature, i.e. increasing the motion of the particles.

By adding and recovering the heat of compression overall efficiencies are possible in such a quasi-adiabatic system, which are theoretically far above those of conventional compressors and turbines.

In practice it is probably not possible to accomplish the adiabatic insulation of a giant high-pressure vessel. The fact is, if the thermal insulation were installed outside the pressure vessel, then the container wall would heat up. On account of the enormous heat capacity of the pressure vessel the heat of compression would then simply result in a slight rise in temperature of the container wall and at this low temperature would largely be lost for a practicable, direct heat recovery. Thermal insulation installed within the high-pressure vessel would on the other hand be subjected to enormous pressure and temperature fluctuations (several hundred bars, several hundred degrees Kelvin), which would destroy the insulation over time. Consequently the high-pressure vessel should be at the temperature of its surroundings.

This requires a necessary intermediate storage of the heat of compression. Another fundamental problem now arises: although heat can be efficiently transferred at high temperature differences and such temperature differences are in principle also advantageous in heat engines (see Carnot efficiency), the losses due to convection, conduction and in particular radiation however also increase correspondingly (proportional to the fourth power of the temperature, according to the Stefan-Boltzmann law).

High-temperature heat accumulator are in therefore principle unsuitable for longer periods of time, which however are basically desirable in energy storage. A known high-temperature accumulator suffers inter alia also from the fact that the discussed high temperature and pressure differences mechanically degrade the storage material (e.g. stone) and the resulting particles can on expansion sandblast the turbine blades.

Phase change materials (PCM) are not suitable for the temperature differences occurring in practice or are still in the experimental stage. They degrade over time and would therefore not be sufficiently efficient according to the present state of scientific knowledge. Also, the known industrial adsorption storage materials silica gel and zeolite are not suitable, since a large portion of the heat of compression is below the discharge temperatures and the heat transfer is a continuous and not a discrete process. With these materials only a relatively small amount of heat could therefore be recovered, which is above their discharge temperatures. The overwhelming amount of heat would be lost at a lower temperature.

SUMMARY OF THE INVENTION

A multi-stage low-temperature heat accumulator might be a possible solution. An adiabatic or quasi-adiabatic compressed air storage power plant constructed in this way would then not be connected to the Carnot efficiency, which can be realised in a thought experiment by arranging the compressor within the adiabatically insulated pressure vessel. Its waste heat would then have to be transferred to the working gas, so that theoretically the energy of the compressor could be completely used.

The object of the invention is therefore to develop a device and a method of the type mentioned in the introduction so that as much of the heat of compression as possible can be stored in the heat accumulator arrangement.

The device according to the invention for the temporary storage of gas and heat comprises a pressure vessel or at least one pressure vessel, a plurality of compressors by means of which a gas can be compressed, a plurality of compression stages connected in series, each of which include one of the compressors and a gas flow path connected downstream of the latter, wherein the pressure vessel is connected downstream of a last of the series-connected compression stages, in which pressure vessel the gas compressed by means of the compressor can be stored, and a heat accumulator arrangement comprising a plurality of heat accumulators, by means of which the heat of compression generated by the compression of the gas can be stored, wherein the heat accumulator arrangement is connected in the gas flow path of each compression stage, a heat accumulator sequence is associated with the heat accumulators and the gas flow path of each compression stage passes through the heat accumulators, in particular with regard to the respective gas flow direction, in the heat accumulator sequence. Preferably the heat of compression in each compression stage can thus be released, in particular stepwise, to the heat accumulators.

According to the invention the heat accumulators are connected in series in the gas flow path of each compression stage, wherein the heat accumulators are connected in the same sequence behind one another in each of these gas flow paths. The heat accumulator arrangement thus forms a staggered heat accumulator connected downstream of each compressor, whose stages are formed by the heat accumulators. Preferably the temperatures of the heat accumulators decrease in the heat accumulator sequence. Owing to the device according to the invention a significantly larger proportion of the heat of compression can be stored in the heat accumulator arrangement than in conventional solutions. In particular the heat accumulator arrangement can be operated at low temperatures and is preferably also operated at a low temperature.

The number of the compression stages is preferably two, at least two, three or at least three. In particular the number of compressors corresponds to the number of compression stages. Preferably each compression stage includes exactly one of the compressors. Preferably exactly one of the compression stages is assigned to each compressor and/or is provided in the latter. The heat accumulator arrangement and/or the heat accumulators include in particular no compressors.

Each compressor can for example also be termed a compression machine. For example, each compressor is a turbo compressor, a screw compressor or a piston compressor.

The pressure vessel is preferably not thermally insulated with respect to the surroundings. Preferably the gas stored in the pressure vessel is at ambient temperature or approximately ambient temperature. The pressure vessel can for example also include a plurality of pressure containers connected behind one another and/or is composed of the latter.

Preferably the heat accumulators are thermally insulated from one another and/or with respect to the surroundings. Thermal equilibrium between the heat accumulators can thus be prevented.

Preferably a predetermined minimum temperature is assigned to each of the heat accumulators. In particular each heat accumulator has at least the minimum temperature associated with it. Advantageously the minimum temperatures associated with the heat accumulators decrease in the heat accumulator sequence.

According to a development of the invention the heat accumulator arrangement comprises one, at least one or a plurality of heating devices. Preferably the heat accumulators can be heated by the heating device or heating devices. In particular each heat accumulator can be heated by the heating device or heating devices to the minimum temperature assigned to it and/or can be maintained at least at this minimum temperature. In this way it can be ensured that each heat accumulator has at least the minimum temperature assigned to it. Preferably each heat accumulator comprises a heating device or one of the heating devices. In particular each heat accumulator can be heated by its heating device to the minimum temperature assigned to it, and/or can be maintained at least at this minimum temperature. Thus, the temperature difference and/or a temperature difference between the heat accumulators can be enforced. In particular the heating devices ensure that the transfer of the heat of compression to the heat accumulators takes place at the or in the region of the desired minimum temperature. Advantageously the temperatures and/or minimum temperatures of the heat accumulators in the heat accumulator sequence exhibit a gradient. The heating device or each of the heating devices is in particular formed as an electrical heating device.

Preferably each heat accumulator comprises a heat storage medium, in which in particular part of the heat of compression can be stored. Preferably each of the heat storage media is fluid. Advantageously the heat accumulators are passive. This is understood in particular to mean that the heat storage medium of each heat accumulator is not circulated and/or pumped round. Preferably the transfer of the heat of compression to the heat storage medium takes place in particular exclusively or principally by convention.

According to one arrangement the predetermined minimum temperature of the first heat accumulator connected in series is 100° C., approximately 100° C., at least 100° C. and/or more than 100° C. In particular the heat storage medium of the first series-connected heat accumulator is glycerine (also called glycerol). Preferably exclusively glycerine is used as heat storage medium of the first series-connected heat accumulator. Glycerine (molecular formula:

$C_3H_8O_3$) occurs for example as a waste product in the production of biofuels and can therefore be obtained relatively cheaply.

A decisive factor for the suitability as a heat storage medium on the basis of the fundamental equation $Q=mc_p\Delta T=\rho c_p V\Delta T$ is the product $c_p\rho$, i.e. the heat capacity times density, which for glycerine ($3.06\times10^6$ J/m³K) is more than twice as high as for silicone oil ($1.50\times10^6$ Jm³K) and is about 70% of the value for water, which is extremely high ($4.40\times10^6$ Jm³K). Here Q denotes the amount of heat added to or withdrawn from the heat storage medium, m denotes the mass of the heat storage medium, $c_p$ is the thermal capacity of the heat storage medium, $\rho$ is the density of the heat storage medium and $\Delta T$ is the difference between the initial temperature and final temperature of the heat storage medium. The thermal conductivity of glycerine (0.286 W/mK) is also about twice as high as for silicone oil. The comparatively environmentally friendly compound glycerine is therefore a relatively good suitable heat storage medium.

The maximum temperature of the first heat accumulator connected in series and/or of the heat storage medium of the first heat accumulator connected in series is in particular below 200° C. On the one hand this maximum temperature is below the boiling point of glycerine (boiling point of glycerine=290° C.), while on the other hand below a temperature of 200° C. no conversion of glycerine to the toxic compound acrolein (also termed acrylaldehyde, molecular formula $C_2H_4O$) takes place.

According to a development of the invention the heat accumulators each comprise a heat accumulator vessel, in which the respective heat storage medium is stored. Each of the heat accumulator vessels can be formed open or closed.

Preferably the heat accumulator vessel of the first heat accumulator connected in series or at least the heat accumulator vessel of the first heat accumulator connected in series can be formed closed. In this way the development of fumes and/or vapour of glycerine, which occurs starting from ca. 150° C., can be counteracted. By means of the heating device and/or by maintaining the minimum temperature of the first heat accumulator connected in series it can in particular furthermore be ensured that during operation the temperature does not fall below the relatively high melting point of glycerine (melting point of glycerine=18° C.).

Each heat accumulator and/or heat accumulator vessel preferably comprises one, at least one or exactly one gas line per compression stage. Preferably the gas lines run through the respective heat accumulators and/or heat accumulator vessels and are thus surrounded in particular by the respective heat storage medium. For example, the gas lines run in the respective heat accumulators and/or heat accumulator vessel in each case in a meandering, helical or screw-shaped manner, or rectilinearly. In particular the gas lines of each compression stage are connected in series, preferably in the heat accumulator sequence. Preferably the series connection from the gas lines of each compression stage is connected in the gas flow path of the respective compression stage. The gas lines of each heat accumulator and/or heat accumulator vessel are in particular arranged in the respective heat storage medium. Through the gas lines of each heat accumulator and/or each heat accumulator vessel heat in particular can be exchanged between the gas and the respective heat storage medium.

Preferably the heat accumulator arrangement comprises two, at least two, three or at least three heat accumulators. The predetermined minimum temperature of the heat accumulator or of each heat accumulator connected downstream of the first series-connected accumulator is preferably less than 100° C. In particular the heat storage medium of the heat accumulator or of each heat accumulator connected downstream of the first series-connected accumulator is water or glycerine.

The heat accumulators are in particular unpressurised. This is understood to mean that the heat accumulators and/or the heat storage media are in particular at ambient pressure ("unpressurised" in the sense of "without excess pressure" with respect to the surroundings).

Each heat accumulator can for example be adjusted via the amount and/or the filling state of each heat storage medium to a desired extent as regards its heat capacity. In particular the heat capacity of each heat accumulator can be increased and/or reduced by adding and/or removing the respective heat storage medium. For example, the operating temperature of the respective heat accumulator can thus be reduced and/or increased as necessary.

According to a modification of the invention the gas is air. Air is as a rule available everywhere in the world. The compressed gas can therefore also be termed compressed air. Furthermore the compressors can also be termed compressed air compressors and/or the pressure vessels can also be termed compressed air vessels.

Each compressor is connected at the output side in particular to the gas flow path of the respective compression stage. Preferably the gas flow path of the last series-connected compression stage is connected at the output side to the pressure vessel and/or to an input of the pressure vessel. The compressor of a first series-connected stage of the compression stages is connected on the input side preferably to an air or gas reservoir or is open to the surroundings. Preferably however at least one gas or air supply device is connected upstream of the first series-connected compression stage, which includes for example a gas or air filter and/or a dehumidifier.

According to one arrangement a cold reservoir device is connected in the gas flow path of the last series-connected compression stage between the heat accumulator arrangement and the pressure vessel. By means of the cold reservoir device the gas fed to the pressure vessel can preferably be cooled, in particular to below ambient temperature. By cooling the gas fed to the pressure vessel moisture can be removed from it and/or moisture can be condensed out from it. This is advantageous since as little moisture as possible is thereby supplied to the pressure vessel. The cold reservoir device preferably includes a coolant, by means of which heat can be extracted from the gas fed to the pressure vessel. Furthermore the cold reservoir device preferably includes a circulating pump, by means of which in particular the coolant can be circulated.

The path that the gas follows through the compressors, in particular with the inter-positioning of the heat accumulator arrangement and/or the heat accumulators, up to the pressure vessel, and/or the path that the gas can follow through the compressors, in particular with the inter-positioning of the heat accumulator arrangement and/or of the heat accumulators, up to the pressure vessel, is preferably also termed the compression path.

According to one arrangement the or several of the or at least one of the compressors also forms or form in particular an expansion device or in each case also an expansion device, by means of which the gas can be expanded. Preferably the or each compression stage, whose compressor is also formed as an expansion device, also forms an expansion stage. A compressor also formed as an expansion device is termed for example a combined compression and expansion machine. A combined compression and expansion machine includes for example a converted two-stroke diesel engine in the cylinder head, which operates as a compressor driven by an electric motor for storage and/or compression and generates compressed air. During recovery and/or expansion it operates as a compressed air motor and the electric motor becomes in particular an electric generator. This allows simple and compact systems. Also, turbine compressors can be realised.

According to a development the device according to the invention comprises the or at least one expansion device, by means of which the gas can be expanded, and the or at least one expansion stage, which includes the expansion device and a gas flow path connected upstream of the latter, wherein the pressure vessel is connected upstream of the expansion stage, the heat accumulator arrangement is connected in the gas flow path of the expansion stage, and the gas flow path of the expansion stage flows or will flow in succession through the heat accumulators, in particular with regard to the gas flow direction, in the reverse heat accumulator sequence. Preferably the gas added to the expansion device can thus be heated, in particular in a stepwise manner, by the heat accumulators.

Advantageously the device according to the invention however comprises the or a plurality of expansion devices, by means of which the gas can be expanded, and the or a plurality of expansion stages connected in series, which respectively contain one of the expansion devices and a gas flow path connected upstream of the latter, wherein the pressure vessel is connected upstream of a first series-connected of the expansion stages, the heat accumulator arrangement is connected in the gas flow path of each expansion stage and the gas flow path of each expansion stage flows or will flow through the heat accumulators, in particular with regard to the respective gas flow direction, in the reverse heat accumulator sequence. Preferably the gas added to each expansion device can thus be heated, in particular in a stepwise manner, by the heat accumulators.

According to a first variant the or several of the or at least one of the compressors forms/form in particular also the or respectively also one of the expansion devices (as already discussed above). In this way material savings can be made. According to a second variant the compressors and the expansion device or expansion devices form in particular devices and/or machines separate and/or different from one another. Accordingly the respective devices and/or machines can be optimally designed for their respective tasks.

The path that the gas follows from the pressure vessel, in particular with the interposition of the heat accumulator arrangement and/or of the heat accumulators, through the expansion device or expansion devices, and/or the path that the gas can follow from the pressure vessel, in particular with the interposition of the heat accumulator arrangement and/or of the heat accumulators, through the expansion device or expansion devices, is preferably termed an expansion path.

According to a first alternative the expansion path coincides wholly or partially or at least partially with the compression path, in particular if at least one of the compressors is formed as an expansion device. According to a second alternative the expansion path is separate from the compression path, in particular if the compressors and the expansion device or expansion devices form devices and/or machines separate and/or different from one another.

Since the gas cools when it expands, the expansion device or expansion devices can ice up. By means of the heat accumulator arrangement connected upstream of the expansion device or each expansion device the gas is heated beforehand, so that icing can be counteracted.

The number of expansion stages is preferably one, at least one, two or at least two. In particular the number of expansion stages corresponds to the number of expansion devices. Preferably each expansion stage includes exactly one of the expansion devices. Preferably each expansion device is assigned to exactly one of the expansion stages and/or is provided in the latter. The heat accumulator arrangement and/or the heat accumulators include in particular no expansion devices. Preferably the number of expansion stages is less than or equal to the number of compression stages.

According to a first alternative each heat accumulator and/or heat accumulator vessel includes preferably one, at least one or exactly one gas return line. In particular the gas return lines are connected in series, preferably in the reverse heat accumulator sequence. Preferably the series connection from the gas return lines is connected to the gas flow path of the expansion stage.

According to a second alternative each heat accumulator and/or heat accumulator vessel includes preferably one, at least one or exactly one gas return line per expansion stage. In particular the gas return lines of each expansion stage are connected in series, preferably in the reverse heat accumulator sequence. Preferably the series connection from the gas return lines of each expansion stage is connected to the gas flow path of the respective expansion stage.

According to a first variant the gas return lines are in particular wholly or partially or at least partially identical to the gas lines. According to a second variant the gas return lines are in particular lines separate from the gas lines.

The gas return lines preferably run through the respective heat accumulators and/or heat accumulator vessels and are in this case surrounded in particular by the respective heat storage medium. For example, the gas return lines run in the respective heat accumulator and/or heat accumulator vessel respectively in a meandering, helical or screw-shaped manner or rectilinearly. The gas return line or lines of each heat accumulator and/or heat accumulator vessel is or are in particular arranged in the respective heat storage medium and/or are surrounded by this. By means of the gas return line or gas return lines of each heat accumulator and/or heat accumulator vessel heat in particular can be exchanged between the gas and the respective heat storage medium.

The expansion device or each expansion device is preferably an expansion machine. For example the expansion device or each expansion device is a turbine, a screw expander or a piston machine.

Each expansion device is connected on the inlet side in particular to the gas flow path of the respective expansion stage. Preferably the gas flow path of the first series-connected expansion stage is connected on the input side in particular to the pressure vessel and/or to an output of the pressure vessel. The expansion device of a last series-connected of the expansion stage is connected on the output side preferably to an air or gas reservoir or is open to the surroundings.

The input and the output of the pressure vessel are in particular different. According to an alternative the input of the pressure vessel is for example identical to the output of the pressure vessel, especially if at least one of the compressors is also formed as an expansion device.

Preferably the expansion device or the expansion devices is/are coupled, in particular mechanically coupled, to at least one machine. Preferably the at least one machine can be driven by means of the expansion device or expansion devices. Advantageously each of the expansion devices is coupled, in particular mechanically coupled, to a machine, which can be driven in particular by the respective expansion device. The at least one machine or the machines are or include in particular at least one or a plurality of electrical generators. By means of the at least one or the several electrical generators in particular electrical energy and/or electric current can be generated.

The electrical heating device or the electrical heating devices can be connected or are connectable for example electrically to the generator or generators. In particular the electrical heating device or the electrical heating devices can be supplied with electrical energy by the generator or generators. Preferably the electrical heating device or the electrical heating devices serve as a load resistance or load resistances for the generator or generators.

The energy stored in the form of compressed gas and heat in the device according to the invention can thus be used to perform work and/or to generate electrical energy. The device according to the invention is or forms, in particular if it comprises the expansion device or expansion devices, preferably a compressed air storage power plant or a part of the same.

Preferably the pressure vessel can be filled with the gas by the compressors and/or compression stages. In particular, preferably in a first process step, the pressure vessel is filled with the gas by the compression stages. Furthermore the pressure vessel can be emptied preferably via the expansion stage or expansion stages. In particular, preferably in a second process stage, the pressure vessel is emptied by the expansion stage or the expansion stages. According to one arrangement the pressure vessel is filled with compressed gas in the first process stage, before the compressed gas stored in the pressure vessel is expanded in the second process stage. In particular the process stages do not proceed simultaneously, but consecutively. For example, there may be a longer period of say several hours between the process stages.

Preferably the compression stages are not simultaneous with the expansion stage or expansion stages, but operate in succession.

In the first process stage the reduction of the pressure of the gas through the removal of heat by the heat accumulator arrangement on filling the pressure vessel reduces in particular the pressure of the gas in the pressure vessel and thus the resistance against which the compressors have to operate. In the second process stage the addition of heat produced by the heat accumulator arrangement on emptying the heat accumulator in the expansion increases the effective pressure, whereby the pressure vessel can be emptied in particular more slowly and the stored gas stock lasts longer.

Preferably a or a first shut-off valve is connected between the last series-connected compression stage and the pressure vessel, by means of which the pressure vessel can be shut-off with respect to the compression stages. Preferably a or a second shut-off valve is connected between the pressure vessel and the expansion stage or the first series-connected expansion stage, by means of which the pressure vessel can be shut off with respect to the expansion stage or the expansion stages. Preferably a or a first one-way valve is connected between the last series-connected compression stage and the pressure vessel, by means of which a reverse flow of gas from the pressure vessel to the compression stages can be prevented. Preferably a or a second one-way valve is connected between the pressure vessel and the expansion stage or the first series-connected expansion stage, by means of which an outflow of gas from the pressure vessel to the expansion stage or expansion stages is or can be made possible. If the output of the pressure vessel is identical to the input of the pressure vessel, preferably the first one-way valve is connected in series with the first shut-off valve, and the second one-way valve is preferably connected in series with the second shut-off valve, wherein these two series connections are in particular connected in parallel to one another. In this connection the one-way valves are preferably connected and/or aligned contrary and/or opposed to one another.

According to a development of the invention the cold reservoir device is furthermore connected downstream of each of the expansion devices and can preferably be cooled by the cold of the expanded gas. Owing to the cooling of the cold reservoir device the gas fed to the pressure vessel for example can be cooled by the cold reservoir device. In particular heat can be extracted from the coolant by the expanded gas. Preferably the cold reservoir device is in addition connected in the gas flow path of the first series-connected expansion stage before the heat accumulator arrangement, so that the gas fed to the expansion stages can be preheated by means of the cold reservoir device. In particular heat can be added through the coolant to the gas fed to the expansion stages. This is possible for example once the cold reservoir device and/or its coolant has been heated by the cooling of the gas fed to the pressure vessel. Thus, the heat removed from the gas fed to the pressure vessel can be utilised to preheat the gas fed to the expansion stages. The cold reservoir device includes for example a Stirling engine, by means of which the circulation pump of the cold reservoir device can be driven, in particular without additional energy having to be supplied to operate the circulation pump. The cold reservoir device is for example also termed a hypo cooler.

Preferably the cold reservoir device utilises, in particular as a low-temperature heat accumulator, the cold of the expanded gas behind the expansion devices first of all to reduce the temperature of the coolant. This then extracts heat (in particular residual heat) from the compressed gas behind the heat accumulator arrangement and cools the compressed gas in this way, in particular to below the ambient temperature. In this way the compressed gas is also in addition dehumidified before it reaches the pressure vessel. Conversely the compressed gas in the expansion and/or energy recovery in the cold reservoir device is already preheated, preferably in two stages, before it passes through the heat accumulator arrangement and reaches the expansion devices. Preferably the coolant of the cold reservoir device can furthermore be used to cool at least one or a plurality of electrical energy recovery units, which are connected in particular electrically downstream of the at least one or the electrical generators, and include for example at least one or several electric current converters. The use of the cold reservoir device is particularly favourable, since in particular the waste cold of the expansion device or expansion devices can be utilised.

The term gas flow path is understood to mean in particular an object or an arrangement of objects, through which gas can be led and/or by means of which a gas-conducting connection can be established. For example, each of the gas flow paths is or includes a gas line or a series connection of gas lines.

According to one arrangement it is possible for the expansion device or at least one of the expansion devices also to form one of the compressors and/or for the or at least one of the expansion stages also to form one of the compression stages. Furthermore it is possible that each expansion device also forms one of the compressors and/or each expansion stage also forms one of the compression stages.

The invention furthermore relates to a method for the temporary storage of gas and heat, wherein a gas is compressed successively in several compression stages and is then stored in a or in at least one pressure vessel, the heat of compression generated by the compression of the gas is stored after each compression in a plurality of heat accumulators, and wherein a heat accumulator sequence is assigned or will be assigned to the heat accumulators, and the gas after each compression passes in succession through the heat accumulators in the heat accumulator sequence so that the heat of compression is released, in particular stepwise, to the heat accumulators.

The method according to the invention is preferably carried out with the device according to the invention. Preferably the device according to the invention is used to carry out the method according to the invention. The method according to the invention can in particular be developed according to all arrangements discussed in connection with the device according to the invention. Furthermore the device according to the invention can be developed according to all arrangements discussed in connection with the method according to the invention.

Preferably the or a predetermined minimum temperature is assigned to each of the heat accumulators. In particular each heat accumulator has at least the minimum temperature assigned to it. Preferably the minimum temperatures assigned to the heat accumulators decrease in the heat accumulator sequence. Preferably each heat accumulator is heated to the minimum temperature assigned to it and/or at least is maintained at this minimum temperature.

Each compression stage preferably includes a compressor. For example each compressor is a turbo compressor, a screw compressor or a piston compressor. Each compressor compresses in particular the gas in the respective compression stage.

According to one arrangement the gas stored in the pressure vessel is expanded in at least one expansion stage, wherein before the expansion the gas passes in succession through the heat accumulators in the reverse heat accumulator sequence and is thereby heated, in particular in a stepwise manner. Preferably the gas stored in the pressure vessel is expanded in succession in a plurality of expansion stages, wherein the gas before each expansion passes through the heat accumulators in the reverse heat accumulator sequence one after the other and is thereby heated, in particular in a stepwise manner.

The or each expansion stage preferably includes an expansion device. The or each expansion device is for example an expansion machine, for example a turbine or piston machine. The or each expansion machine is in particular driven by the gas expanding in the or in the respective expansion stage.

According to a first variant the or several of the or at least one of the compression stages in particular also forms/form the or respectively also one of the expansion stages. According to a second variant the compression stages are in particular separate from and/or different to the expansion stage or expansion stages.

Preferably at least one or several machines are driven, in particular mechanically, by the expanding gas and/or by the expansion device or expansion devices. The at least one machine or the machines are or include in particular at least one of several electrical generators. The at least one or the electrical generators generate in particular electrical energy and/or electric current.

Advantageously, preferably in the or in a first process stage the pressure vessel is filled by the compression stages with the gas. Furthermore preferably in the or in a second process stage the pressure vessel is emptied by the expansion stage or the expansion stages. In particular the pressure vessel in the first process stage is filled with compressed gas, before the compressed gas stored in the pressure vessel is expanded in the second process stage. Preferably the process stages do not proceed simultaneously, but one after the other. Advantageously the second process stage proceeds after the first process stage.

According to an arrangement the gas fed to the pressure vessel is cooled by a coolant after its last passage through the heat accumulator, in particular is cooled to below the ambient temperature. In this way moisture can be removed from the gas fed to the pressure vessel and/or can be condensed out of the latter.

According to a development the coolant is cooled after each expansion by the cold of the expanded gas. Due to the cooling of the coolant the gas fed to the pressure vessel can for example be cooled by the coolant. Preferably in addition the gas added to the or to the First expansion stage is preheated by means of the coolant before the or before the first passage through the heat accumulator. This is possible for example after the coolant has been heated by the cooling of the gas fed to the pressure vessel. Accordingly the heat removed from the gas fed to the pressure vessel can be used to heat the gas fed to the expansion stage or stages.

DETAILED DESCRIPTION OF THE INVENTION

Figure 1:
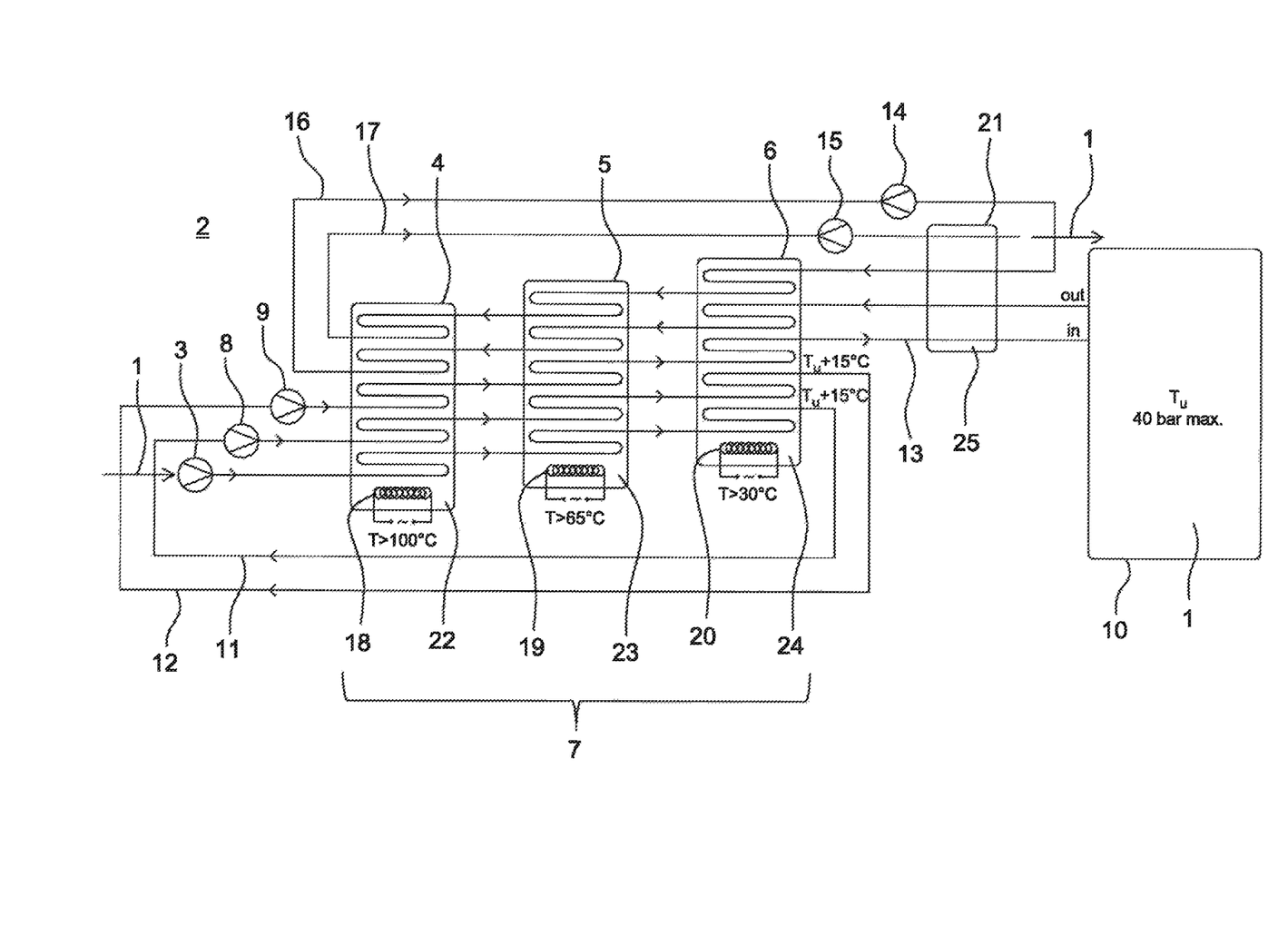
FIG. 1 is a schematic representation of a device according to an embodiment of the invention.

FIG. 1 shows a schematic representation of a device according to an embodiment of the invention, in which air 1 from the surroundings 2 is compressed by means of a first compressor 3 and then passes in succession through a plurality of heat accumulators 4, 5 and 6 of a heat accumulator arrangement 7. After this the air 1 is additionally compressed by a second compressor 8 and then passes in succession through the heat accumulators 4, 5 and 6. The compressed air is then compressed further by a third compressor 9 and next passes in succession through the heat accumulators 4, 5 and 6. The air 1 is then stored in a pressure vessel 10. The respective flow direction of the air 1 is represented by arrows and arrow heads. The compressors 3, 8 and 9 are also termed compressors.

A gas flow path is connected downstream of each compressor, which together with the respective compressor forms a compression stage. Thus, the gas flow path 11 is connected downstream of the compressor 3, the gas flow path 12 is connected downstream of the compressor 8, and the gas flow path 13 is connected downstream of the compressor 9. The gas flow path 11 connects the output of the compressor 3 to the input of the compressor 8, the gas flow path 12 connects the output of the compressor 8 to the input of the compressor 9, and the gas flow path 13 connects the output of the compressor 9 to the input "in" of the pressure vessel 10. The input of the compressor 3 is open to the surroundings. The heat accumulator arrangement 7 is connected in each of these gas flow paths, wherein the heat accumulators 4, 5 and 6 in the flow direction of the air 1 have the same sequence in each of the gas flow paths 11, 12 and 13.

If the pressure vessel 10 is sufficiently full, then the air 1 stored in it under pressure can be used to drive one or more expansion devices in the form of turbines 14 and 15. To this end the air stored in the pressure vessel 10 flows in succession through the heat accumulators 6, 5 and 4 and is fed to the first turbine 14. Following this the compressed air flows again in succession through the heat accumulator 6, 5 and 4 and is passed through the second turbine 15. After the second turbine 15 the air 1 is vented to the surroundings 2.

A gas flow path is connected upstream of each turbine, which together with the respective turbine forms an expansion stage. In this connection the turbine 14 is connected upstream of the gas flow path 16 and the turbine 15 is connected upstream of the gas flow path 17. The gas flow path 16 connects the output "out" of the pressure vessel 10 to the input of the turbine 14 and the gas flow path 17 connects the output of the turbine 14 to the input of the turbine 15. The output of the turbine 15 is open to the surrounding 2. The heat accumulator arrangement 7 is connected in each of these gas flow paths, wherein the heat accumulators 6, 5 and 4 in the flow direction of the air have the same sequence in each of the gas flow paths 16 and 17. However, the air 1 flows in the reverse sequence through the heat accumulators in the expansion stages as in the compression stages.

The discussed process takes place in two stages. In a first process stage the pressure vessel 10 is filled with air. In a following second process stage the pressure vessel 10 is emptied and the air stored in it is used to drive the turbines 14 and 15. If the air in the pressure vessel 10 is exhausted or the pressure of the air in the pressure vessel 10 falls below a limiting value, the process can revert to the first process stage, etc. The two process stages thus proceed in succession and not simultaneously.

The heat accumulators 4, 5 and 6 have in each case a heating device 18, 19 and 20, so that the heat accumulators 4, 5 and 6 can be maintained by the heating devices 8, 19 and 20 at minimum temperatures, which decrease in the sequence 4, 5 and 6 of the heat accumulators. The heat accumulators thus have a decreasing temperature in the sequence 4, 5 and 6. Accordingly the temperature of the heat accumulator 4 is greater than the temperature of the heat accumulator 5, which in turn is greater than the temperature of the heat accumulator 6. Without the heating devices the temperatures of the heat accumulators 4, 5 and 6 could equalise, for example with the surroundings. Furthermore the heat accumulators 4, 5 and 6 are filled respectively with a heat storage medium 22, 23 and 24. The heat storage medium 22 of the first heat accumulator 4 is in particular glycerine, since the temperature of the first heat accumulator 4 is at least 100° C. The other heat accumulators 5 and 6 have a temperature below 100° C. and are filled with water as heat storage medium 23 and 24.

The air compressed by the compressors 3, 8 and 9 is heated by the compression (heat of compression). In order that the air for filling the pressure vessel 10 flows after each compression in succession through the heat accumulators 4, 5 and 6, the heat of compression is at least partially released to the heat accumulators and is stored stepwise in the latter.

Before the air stored in the pressure vessel 10 is fed to the turbine 14, the air 1 flows in succession through the heat accumulators, 6, 5 and 4 and is thereby heated stepwise. The compressed air is then fed to the turbine 15, but before that however flows again in succession through the heat accumulator 6, 5 and 4 and is thereby heated stepwise. Heating the air before it enters the turbines is desirable so that the turbines do not ice up.

A cold reservoir device 21 containing a coolant 25 is connected between the last heat accumulator 6 and the pressure vessel 10. During the filling of the pressure vessel 10 with air the coolant 25 cools the air leaving the heat accumulator 6 after the last compression to below ambient temperature, so that water can condense out from the air and does not collect in the pressure vessel 10. The cold reservoir device 21 is furthermore connected downstream of each turbine 14 and 15, so that during operation of the turbines 14 and 15 the cold air flowing out of the turbines cools the coolant 25. The cooled coolant 25 can thus be used again in the next filling of the pressure vessel 10 in order to cool the air fed to the pressure vessel 10. Owing to this cooling of the coolant 25 heat is however also added to the air flowing out from the turbines, which produces a preheating of the air flowing out from the turbine 14. The cold reservoir device 21 is furthermore connected in the gas flow path 16 and in this connection is connected upstream of the heat accumulator arrangement 7. Accordingly the coolant 25 can also be used to preheat the air leaving the pressure vessel 10.

The aim and purpose of the device is to store temporarily excess electrical energy (i.e. energy that is not required at the time of its generation) generated by conventional power plants, such as for example wind turbines, in the form of compressed gas (here compressed air) and heat. Should there be an increased energy demand at a later time the stored energy can be released again and used to drive the turbines 14 and 15. The turbines 14 and 15 can in turn drive electric generators for generating electrical energy.

An example of possible temperatures and pressures is given hereinafter.

The minimum temperature of the first heat accumulator 4 is 100° C. The actual temperature of the first heat accumulator 4 is between 100° C. and 120° C. The minimum temperature of the second heat accumulator 5 is 65° C. The actual temperature of the second neat accumulator 6 is between 65° C. and 90° C. The minimum temperature of the third accumulator 6 is 30°. The actual temperature of the third heat accumulator 4 is between 30° C. and 60° C.

First Process Stage:

The first compressor 3 compresses the air 1 from the surroundings to 3.4 bar. The compressed air then has a temperature of 150° C. on account of the heat of compression. The air then passes in succession through the heat accumulators 4, 5 and 6. Since the temperature of the compressed air before entering the heat accumulators is above the temperatures of the heat accumulators, it releases heat to the heat accumulators. On leaving the heat accumulators the temperature of the air is about 15° C. above ambient temperature $T_u$.

The second compressor 8 compresses the air further to 11.6 bar, which then has a temperature of 120° C. Following this the air flows in succession through the heat accumulators 4, 5 and 6 and releases heat to the heat accumulators. On leaving the heat accumulators the temperature of the air is about 15° C. above ambient temperature $T_u$.

The third compressor 9 compresses the air further to 40 bar, which then has a temperature of 150° C. Following this the air flows in succession through the heat accumulators 4, 5 and 6 and releases heat to the heat accumulators. After the air leaves the heat accumulators the air passes through the cold reservoir device 21 and is cooled in this to below ambient temperature. The air is then stored at a pressure of 40 bar in the pressure vessel 10. Since the pressure vessel 10 is not thermally insulated with respect to the surroundings, the temperature of the air stored in the pressure vessel 10 equalises with the ambient temperature $T_u$.

When the pressure vessel 10 is full, the heat accumulator 4 has a final temperature of 120° C., the heat accumulator 5 has a final temperature of 90° C. and the heat accumulator 6 a final temperature of 60° C.

Second Process Stage:

To operate the turbines 14 and 15 the air leaves the pressure vessel 10, is preheated in the cold reservoir device 21, and then passes in succession through the heat accumulators 6, 5 and 4. The air is thereby heated to 100° C. and is fed to the turbine 14. Behind the turbine 14 the air in the cold reservoir device 21 is preheated and then passes in succession through the heat accumulators 6, 5 and 4. The air is thereby heated to 100° C. and is fed to the turbine 15. The air is then vented to the surroundings.

LIST OF REFERENCE NUMERALS

1 Air
2 Surroundings
3 Compressor
4 Heat accumulator
5 Heat accumulator
6 Heat accumulator
7 Heat accumulator arrangement
8 Compressor
9 Compressor
10 Pressure vessel
11 Gas flow path
12 Gas flow path
13 Gas flow path
14 Expansion device/turbine
15 Expansion device/turbine
16 Gas flow path
17 Gas flow path
18 Heating device
19 Heating device
20 Heating device
21 Cold reservoir device
22 Heat storage medium (glycerine)
23 Heat storage medium (water)
24 Heat storage medium (water)
25 Coolant
in input of the pressure vessel
out output of the pressure vessel

The invention claimed is:

1. A device for temporary storage of gas and heat, comprising:
   a plurality of compressors for compressing a gas;
   a plurality of compression stages connected in series, each compression stage including one of the plurality of compressors and a gas flow path connected downstream of the one of the plurality of compressors;
   at least one pressure vessel connected downstream of a last compression stage of the plurality of compression stages in the series, in which the gas compressed by the plurality of compressors is stored;
   a heat accumulator arrangement including a plurality of heat accumulators, in which the heat generated by the compression of the gas is stored, the plurality of heat accumulators connected in a heat accumulator sequence, the gas flow path of each compression stage passing through the heat accumulators in succession in the heat accumulator sequence;
   a plurality of expansion devices for expanding the gas;
   a plurality of expansion stages connected in series, each expansion stage including one of the expansion devices and a gas flow path connected upstream of the respective expansion device, wherein the pressure vessel is connected upstream of a first expansion stage of the plurality of expansion stages in the series;
   the heat accumulator arrangement being connected in the gas flow path of each expansion stage and the gas flow path of each expansion stage passing through the heat accumulators in succession in a sequence reverse of the heat accumulator sequence; and
   a cold reservoir device connected in the gas flow path of the last compression stage of the plurality of compression stages in the series between the heat accumulator arrangement and the pressure vessel;
   wherein the cold reservoir device is further connected downstream of each of the expansion devises and can be cooled by the cold from the expansion of the gas, so that the gas fed to the pressure vessel can be cooled by the cold reservoir device.

2. The device according to claim 1, wherein temperatures of the heat accumulators decrease in the heat accumulator sequence.

3. The device according to claim 1, wherein a predetermined minimum temperature is assigned to each heat accumulator and the heat accumulator arrangement comprises at least one heating device, by which each heat accumulator can be heated to the predetermined minimum temperature assigned to the heat accumulator.

4. The device according to claim 3, wherein the minimum temperatures assigned to the heat accumulators decrease in the heat accumulator sequence.

5. The device according to claim 4, wherein the predetermined minimum temperature of the first heat accumulator in the heat accumulator sequence is at least 100° C.

6. The device according to claim 5, wherein the heat storage medium of the first heat accumulator in the heat accumulator sequence is glycerine.

7. The device according to claim 5, wherein the predetermined minimum temperature of at least one heat accumulator connected downstream of the first heat accumulator in the heat accumulator sequence is less than 100°.

8. The device according to claim 7, wherein the heat storage medium of the at least one heat accumulator connected downstream of the first heat accumulator in the heat accumulator sequence is water.

9. The device according to claim 1, wherein each heat accumulator comprises a heat storage medium, in which part of the heat generated by compression is stored.

10. The device according to claim 9, wherein the heat storage medium is fluid.

11. The device according to claim 1, wherein the gas is air.

12. The device according to claim 1, wherein the cold reservoir device is in addition connected in the gas flow path of the first expansion stage of the plurality of expansion stages in the series before the heat accumulator arrangement, so that the gas fed to the expansion stages can be preheated by the cold reservoir device.

13. A method for the temporary storage of gas and heat, comprising the steps of:
- successively compressing a gas in a plurality of compression stages connected in series;
- storing the compressed gas in at least one pressure vessel;
- storing heat generated by the compression of the gas after each compression stage in a plurality of heat accumulators;
- wherein a heat accumulator sequence is associated with the heat accumulators and the gas after each compression stage flows in succession through the heat accumulators in the heat accumulator sequence, so that the heat generated by compression is released to the heat accumulators;
- connecting the pressure vessel upstream of a first expansion stage of a plurality of expansion stages connected in series;
- connecting the heat accumulators in a gas flow path of each expansion stage and the gas flow path of each expansion stage passing through the heat accumulators in succession in a sequence reverse of the heat accumulator sequence;
- expanding the gas stored in the pressure vessel successively in the plurality of expansion stages, wherein the gas before each expansion stage flows in succession through the heat accumulators in the sequence reverse of the heat accumulator sequence and is thereby heated;
- connecting a cold reservoir device downstream of a last compression stage of the plurality of compression stages in the series between the heat accumulators and the pressure vessel; and
- cooling the gas fed to the pressure vessel by the cold reservoir device using the cold from the expansion of the gas by further connecting the cold reservoir device downstream of each of the expansion stages.

14. The method according to claim 13, wherein temperatures of the heat accumulators decrease in the heat accumulator sequence.

15. The method according to claim 13, wherein a predetermined minimum temperature is associated with each heat accumulator and the heat accumulators include at least one heating device;
- wherein each heat accumulator is held at least at the associated predetermined minimum temperature by the at least one heating device; and
- wherein the predetermined minimum temperatures of the heat accumulators decrease in the heat accumulator sequence.

* * * * *